June 7, 1932.  A. S. TERHAAR  1,861,762
FRESNO
Filed Aug. 20, 1930  2 Sheets-Sheet 1
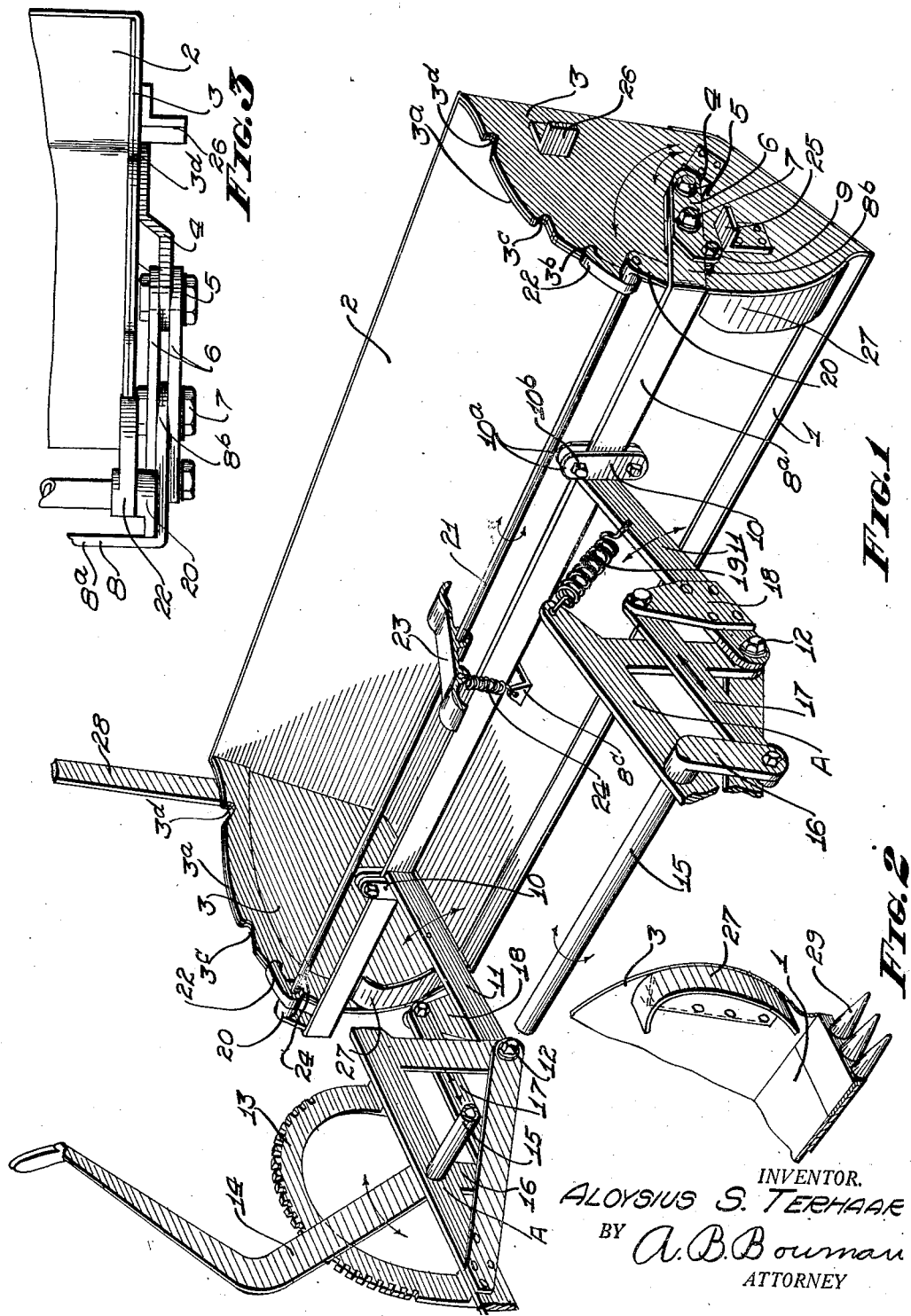
INVENTOR.
ALOYSIUS S. TERHAAR
BY A. B. Bouman
ATTORNEY INVENTOR.
ALOYSIUS S TERHAAR
BY A.B.Bowman
ATTORNEY Patented June 7, 1932

1,861,762

UNITED STATES PATENT OFFICE

ALOYSIUS S. TERHAAR, OF SAN DIEGO, CALIFORNIA

FRESNO

Application filed August 20, 1930. Serial No. 476,627.

My invention relates to fresnos, and the objects of my invention are:

First, to provide an implement of this class particularly adapted for use with a tractor;

Second, to provide a device of this class which easily operates in awkward places, such as in corners or around obstructions;

Third, to provide an implement of this class which may be easily raised clear of the ground so that the dirt or material carried therein may be transported, or permit the tractor to back up between loads;

Fourth, to provide an implement of this class which tends to lift over obstructions such as deeply imbedded stones, roots or the like, without dumping its load;

Fifth, to provide an implement of this class which may be adjusted so as to merely skim a thin layer of earth or the like, or made to dig in so as to gather a relatively thick layer;

Sixth, to provide an implement of this class, which is easily held in a locked position in which the load gathered thereby is retained and readily released by the operator so as to automatically dump the load wherever desired;

Seventh, to provide an implement of this class which may be readily manipulated so as to spread the contents or deposit it in a pile;

Eighth, to provide an implement of this class which may be readily provided with a scarifier so that this implement may be used on the ground which has not previously been loosened, thus accomplishing both the scarifying and the scraping or excavating of the ground in a single operation; and Ninth, to provide on the whole a novelly constructed implement of this class which is particularly simple of construction and of operation, durable, efficient in its action, and which will not readily deteriorate or get out of order.

Figure 4:
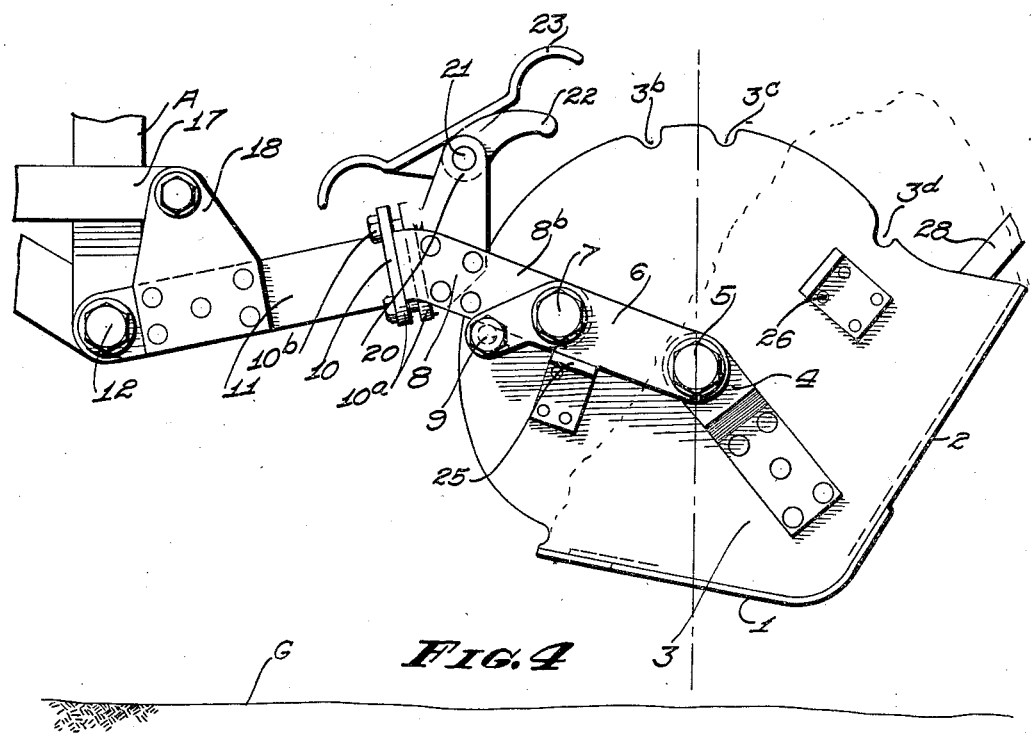
Figure 5:
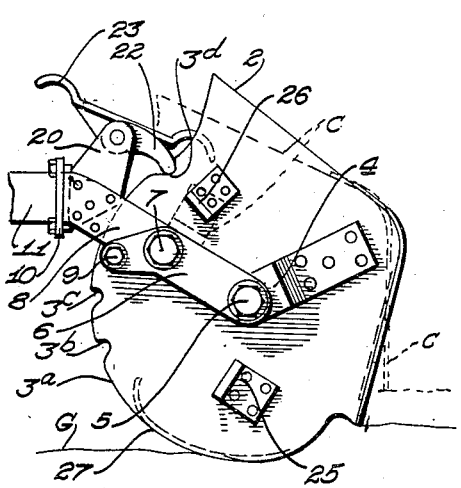
Figure 6:
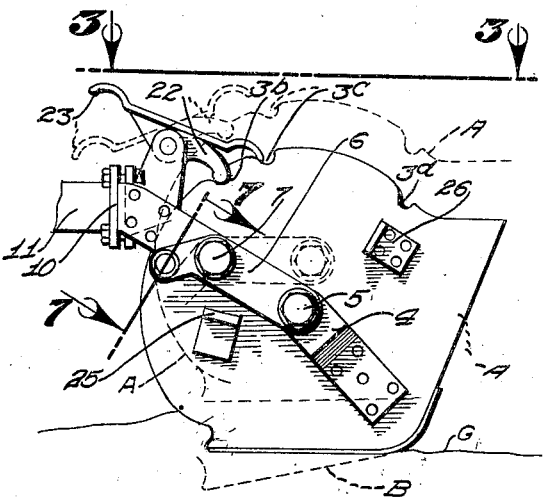
Figure 7:
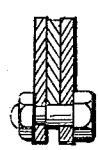

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a perspective view of my fresno, showing fragmentarily means for connecting it with a tractor; Fig. 2 is a fragmentary perspective view of one corner of the fresno showing a scarifier arranged along the forward edge of the fresno; Fig. 3 is an enlarged fragmentary plan view of one end of the fresno taken along the line 3—3 of Fig. 6; Fig. 4 is a side elevational view of the fresno in its raised position, the supporting mechanism for the fresno shown fragmentarily; Fig. 5 is a similar side view showing by solid lines the position of the fresno when spreading the earth or dirt, showing by dotted lines the position of the fresno when dumping dirt; Fig. 6 is a similar end view of the fresno when in position for gathering dirt and showing by dotted lines the manner in which it shifts in order to rise over obstacles as well as its position when digging into the ground; and Fig. 7 is a fragmentary sectional view of the connecting bar and link member taken through 7—7 of Fig. 6.

Similar characters of reference refer to similar parts and portions throughout the several views of the drawings.

Bottom member 1, back member 2, end members 3, brackets 4, pins 5, link members 6, journal pins 7, yoke bar 8, stop pins 9, clamp means 10, draw bars 11, pins 12, quadrant 13, hand lever 14, rod 15, arm members 16, link bars 17, brackets 18, compensating springs 19, bracket bearings 20, shaft 21, catch dogs 22, foot lever 23, catch dog release spring 24, stop brackets 25 and 26, shoes 27, hand lever 28, and scarifier teeth 29 constitute the principal parts and portions of my improved fresno.

The fresno comprises a flat bottom member 1 preferably formed of sheet metal. Its rear side is integrally joined to a back member 2, which slopes upwardly therefrom at an obtuse angle. The bottom member 1 and back member 2 are joined at their ends to end members 3, which are vertically disposed, that is, at right angles to the bottom member and to the back member also. The two edges of each side member joined to the bottom and back members are straight, while the remaining edge thereof is curved. The margins of this curved portion designated 3a extend above the upper edge of the back member and in front of the forward edge of the bottom member, as shown best in the several side views, Figs. 4, 5, and 6.

Except for the portions of this curved edge joining the back and side portions, said curved edge 3a is arcuate. Secured to each end member is a bracket 4, which supports a pin 5 at substantially the center of curvature of the arcuate edge 3a. Journalled on each pin 5 and straddling the corresponding bracket 4, is a pair of link members 6. These link members normally extend forwardly and upwardly from the pins 5 and support near their extended ends a journal pin 7.

A substantially U-shaped yoke bar 8 is provided, the cross portion 8a of which extends across the forward side of the fresno, while the leg portions designated 8b extend at right angles to the cross portion and on the outer sides of the end member 3. The extended ends of these leg portions 8b fit between the extended portions of the pair of link members 6, and are journalled upon the pins 7.

The extended ends of the link members 6 extend below the lower edge of the corresponding leg portions 8b and are connected together by stop pins 9. The two stop pins 9 engage the under side of the corresponding leg portions 8b when the corresponding link members are substantially continuing longitudinally from the leg portions 8b, as shown best in the end views in Figs. 4, 5, and 6.

The pins 9 prevent the fresno from rotating clockwise about the pins 7 beyond a certain definite point.

Secured to the cross portion 8a of the coupling bar 8 by means of clamp portions 10 is a pair of draw bars 11. The draw bars extend substantially horizontally and forwardly from the fresno. Each clamp comprises a pair of plate members which fit on opposite sides of the cross portion 8a, as shown best in Fig. 1, and receive bolts 10b which draw the plates 10a together so as to clamp said cross portion 8a. One of the plates 10a is secured to or made integral with the corresponding draw bar 11. The two draw bars are arranged in spaced parallel relation with each other, and are rotatably secured by means of journal pins 12 to the chassis frame A of the tractor or the like, which is shown fragmentarily in Fig. 1.

Mounted on the chassis A is a quadrant 13 arranged to coact with a hand lever 14. The hand lever rotates a rod 15 to which are attached depending arms 16. These arms, in turn, are pivotally secured to the extended ends of link bars 17. These link bars extend forwardly and are, in turn, pivotally secured to upwardly extending bracket members 18 rigidly secured to the draw bars 11.

With this connecting arrangement, rearward movement of the extended end of the hand lever 14 causes the fresno to rise. In order to relieve or reduce the effort required to move the hand lever 14, spring 19 extends between the draw bars 11 and the chassis frame A in such a manner as to exert an upward pull upon the draw bars 11, as shown best in Fig. 1.

Supported upon the leg portions 8b of the yoke bar, adjacent the junctures thereof with the cross portion 8a, is a pair of upwardly extending bracket bearings 20. These two bracket bearings support a shaft 21, which extends therebetween along the forward side of the fresno. Secured to the shaft 21, adjacent the bracket bearings 20, is a pair of catch dogs 22, which are adapted to engage the curved edge 3a of the end member 3. The curved edge of each end member 3 is provided with notched portions 3b, 3c, and 3d, which, when engaged by the dogs 22, hold the fresno in certain desired shifted positions, which will be discussed in more detail hereinafter.

Also secured upon the middle of the shaft 21, is a foot lever 23, which is mounted intermediate its ends, as shown in Figs. 1, 4, 5, and 6.

The catch dogs 22 are normally held out of engagement with the several notches 3b, 3c, or 3d, by means of a spring 24, which extends between the foot lever 23 and a bracket 8c, supported by the cross portion 8a of a yoke bar, as shown in Fig. 1.

In addition to the notches 3b, 3c, and 3d, the end members 3 support a pair of stop brackets 25 and 26, which limit the rotational movement of the fresno about the pins 5.

One of the end members 3 is provided with a normally upwardly extending hand lever 28, shown fragmentarily in Figs. 1 and 4. This hand lever 28 is used when desiring to aid rotation of the fresno in one direction or the other about the pins 5. Arranged at the forward edge and extending inwardly from the inner side of each of the end members 3 is an arcuate shoe 27 which is shown best in Figs. 1, 2, and 5.

The shoes support the fresno when in the two positions shown in Fig. 5. The curvatures are increased at the forward or normally upper ends of the shoes so that when the shoes are in use they readily ride over the ground.

The forward edge of the bottom member 1 may be sharpened so that the fresno readily engages the ground or may be provided with scarifier teeth 29, as shown fragmentarily in Fig. 2. With the scarifier attached to the forward edge of the bottom member, the fresno may be drawn over packed earth, whereby the scarifier teeth dig in and loosen the earth so as to be immediately collected by the fresno, thus accomplishing in one operation and with one implement what formerly required at least two operations and two separate implements.

Operation of my improved fresno is as follows:

When travelling from one place to another with the fresno or when carrying loads, usually for short distances, or further, when backing up, the fresno is carried in the raised position shown in Fig. 4. In this position, the greater weight of the fresno, loaded or empty, is behind a vertical plane through the pins 5 so that the fresno tends to rotate clockwise until the stops 25 engage the link members 6. The link members, in turn, tend to rotate clockwise about the pins 7 until limited in this movement by the stop pins 9. When in this position, the tractor may be backed up to a corner of the field or other awkward place, whereupon the fresno is lowered to the position shown in Fig. 6.

Any forward movement of the tractor tends to cause the fresno to rotate counterclockwise. By depressing the catch dogs 22, so as to engage the first notch 3b, the fresno is held in the position shown by solid lines in Fig. 6. When thus held, the fresno, as it moves forward, scrapes up a layer of earth. Should the fresno strike objects having greater than the desired resistance or normal resistance of the ground, the fresno tends to ride over them, even rising, if need be, as high as the dotted lines indicated by A in Fig. 6. This movement is about the pins 7. For this reason, the weight of the fresno and the earth therein tends to hamper this upward movement, and thereby prevent the fresno from riding over dirt that it is desired to gather. The resistance to this upward movement can be controlled by bearing down on the proper side of the foot lever 23.

If it is desired to dig into the ground, the catch dogs are allowed to engage the second set of notches 3c, in which case the bottom member of the fresno occupies the position indicated by the dotted lines B in Fig. 6.

When it is desired to discharge and spread the dirt, the catch dogs are allowed to engage the third set of notches 3d, as shown by solid lines in Fig. 5. In this position, the fresno rides upon the shoes 27.

If it is desired to dump the dirt in a pile, the fresno is allowed to rotate counterclockwise until the stops 26 engage the link members 6, as shown by the dotted position indicated by C in Fig. 5.

It will also be noted that by adjusting the clamps 10 along the cross portion of the connecting bar or yoke 8, the position of the fresno may be offset to one or the other side of the tractor, so as to enable the fresno to gather dirt adjacent to fences or other walls.

It will also be noted that the fresno may be carried quite close to the tractor so that with the tractor it forms a particularly compact piece of equipment.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an implement of the class described, a fresno open at its normally upper and forward sides, a yoke means connected to the ends of said fresno, said fresno arcuately shiftable about its points of connection with said yoke means, means for locking said fresno in various positions relative to said yoke means, a draw bar extending forwardly from said yoke means, and mechanism for pivoting said draw bar about its forward end whereby said fresno is elevated or lowered.

2. In an implement of the class described, a fresno open at its normally upper and forward sides, a yoke means connected to the ends of said fresno, said fresno arcuately shiftable about its points of connection with said yoke means, means for locking said fresno in various positions relative to said yoke means, shoes arranged inwardly of the ends of said fresno for supporting the same when its normally forward side faces downwardly, a draw bar extending forwardly from said yoke means, and mechanism for pivoting said draw bar about its forward end whereby said fresno is elevated or lowered.

3. In an implement of the class described, a fresno open at its normally upper and forward sides, a yoke means connected to the ends of said fresno, said fresno arcuately shiftable about a first axis substantially coinciding with the longitudinal axis of said fresno and also shiftable about a second axis located intermediate said first axis and the forward side of said fresno.

4. In an implement of the class described, a fresno open at its normally upper and forward sides, a yoke means connected to the ends of said fresno, said fresno arcuately shiftable about a first axis substantially coinciding with the longitudinal axis of said fresno and also shiftable about a second axis located intermediate said first axis and the forward side of said fresno, and a draw bar extending forwardly from said yoke means.

5. In an implement of the class described, a fresno including a bottom, rear side and end members and open towards its normally upper and forward sides, yoke means extending across the forward side of said fresno and overhanging the ends thereof, link means oscillatably connected to the ends of said fresno, said link means also oscillatably connected to said yoke means forwardly of its connection with the ends of said fresno, a draw bar extending forwardly from said yoke means and adapted to be oscillatably joined to a traction means, and mechanism for shifting said draw bar so as to raise and lower said fresno.

6. In an implement of the class described, a fresno open at its normally upper and forward sides, a yoke means connected to the ends of said fresno, said fresno arcuately shiftable about its points of connection with said yoke means, means for locking said fresno in various positions relatively to said yoke means, a draw bar extending forwardly from said yoke means, mechanism for pivoting said draw bar about its forward end whereby said fresno is elevated or lowered, and clamp means connecting said draw bar to said yoke means whereby said fresno is shiftable laterally into offset relation with said draw bar.

7. In an implement of the class described, a fresno including a bottom, rear side and end members and open towards its normally upper and forward sides, yoke means extending across the forward side of said fresno and overhanging the ends thereof, link means oscillatably connected to the ends of said fresno, said link means also oscillatably connected to said yoke means forwardly of its connection with the ends of said fresno, a draw bar extending forwardly from said yoke means and adapted to be oscillatably joined to a traction means, mechanism for shifting said draw bar so as to raise and lower said fresno, and clamp means connecting said draw bar to said yoke means whereby said fresno is shiftable laterally into offset relation with said draw bar.

8. In an implement of the class described, a fresno including a bottom, rear side and end members and open towards its normally upper and forward sides, yoke means joined to the ends of said fresno and extending across the forward side thereof, a pair of draw bars, clamp means joining said draw bars to said yoke means intermediate the ends thereof, said yoke means laterally shiftable relative to said draw bars whereby said fresno assumes an offset relation with said draw bars.

9. In an implement of the class described, a fresno including a bottom, rear side and end members and open towards its normally upper and forward sides, yoke means joined to the ends of said fresno and extending across the forward side thereof, a pair of draw bars, clamp means joining said draw bars to said yoke means intermediate the ends thereof, said yoke means laterally shiftable relative to said draw bars whereby said fresno assumes an offset relation with said draw bars, said fresno arcuately shiftable about a first axis substantially coinciding with the longitudinal axis of said fresno and also shiftable about a second axis located forwardly of said longitudinal axis.

In testimony whereof, I have hereunto set my hand at San Diego, California, this 9th day of August, 1930.

ALOYSIUS S. TERHAAR.